US011488171B2

(12) United States Patent
Zhang et al.

(10) Patent No.: US 11,488,171 B2
(45) Date of Patent: Nov. 1, 2022

(54) RISK MANAGEMENT AND CONTROL METHOD AND DEVICE

(71) Applicant: ADVANCED NEW TECHNOLOGIES CO., LTD., Grand Cayman (KY)

(72) Inventors: Tianyi Zhang, Hangzhou (CN); Man Long, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 609 days.

(21) Appl. No.: 16/535,746

(22) Filed: Aug. 8, 2019

(65) Prior Publication Data

US 2019/0362355 A1 Nov. 28, 2019

Related U.S. Application Data

(63) Continuation of application No. PCT/CN2018/076514, filed on Feb. 12, 2018.

(30) Foreign Application Priority Data

Feb. 20, 2017 (CN) ......................... 201710089854.5

(51) Int. Cl.
*G06Q 20/40* (2012.01)
*G06F 17/16* (2006.01)

(52) U.S. Cl.
CPC ......... *G06Q 20/4016* (2013.01); *G06F 17/16* (2013.01); *G06Q 20/401* (2013.01)

(58) Field of Classification Search
CPC .. G06Q 20/4016; G06Q 20/401; G06Q 40/08; G06F 17/16
See application file for complete search history.

(56) References Cited

U.S. PATENT DOCUMENTS 8,020,763 B1 * 9/2011 Kowalchyk ............ G06Q 30/06 705/40
3,028,901 A1 10/2011 Henry et al.
(Continued)

FOREIGN PATENT DOCUMENTS

CN 1926569 A 3/2007
CN 101504745 A 8/2009
(Continued)

OTHER PUBLICATIONS

"Building Predictive Models in Two Stages with Meta-Learning Templates optimized by Genetic Programming", Pavel Kordik, Dec. 1, 2014, IEEE (Year: 2014).*
(Continued)

*Primary Examiner* — Neha Patel
*Assistant Examiner* — Duan Zhang

(57) ABSTRACT

Methods, systems, and apparatus, including computer programs encoded on computer storage media, for a risk management method are provided. One of the methods includes: determining a candidate verification mode set comprising one or more candidate verification modes for a target event; determining output weights for at least some of the verification modes in the candidate verification mode set; and selecting a verification mode for risk management of the target event from the candidate verification mode set based on the output weights. In this method, multiple factors, such as risk type, device type, user preference, are taken into consideration in an quantification process when selecting a verification mode. Thus this method avoids excessive reliance on subject understanding of a transaction, improves the robustness of risk management against unauthorized transactions, and reduces unnecessary interference to authorized transactions.

15 Claims, 3 Drawing Sheets

101 identify an event
102 determine applicable verification mode set and available verification mode set
103 determine customized output verification modes
104 determine event attribute weight
105 quantify and rank the verification modes based on the event attribute weights and management attribute weights
106 select a verification mode based on the quantification and rank result

(56) References Cited

U.S. PATENT DOCUMENTS 8,527,418 B2 9/2013 Enzaldo et al.
8,613,055 B1 12/2013 Tomilson et al.
9,984,371 B2 5/2018 Chitragar et al.
10,176,478 B2 1/2019 Griggs et al.
10,210,518 B2 2/2019 Alnajem
10,970,431 B2 * 4/2021 Chang .................. G06Q 40/025
11,106,994 B1 * 8/2021 Batalov .................... G06N 5/04
2002/0133721 A1 * 9/2002 Adjaoute ............ H04L 63/0407 726/23
2002/0160711 A1 * 10/2002 Carlson .............. G06K 19/0723 455/41.1
2003/0158815 A1 8/2003 Yoshida et al.
2004/0267660 A1 12/2004 Greenwood et al.
2005/0097320 A1 5/2005 Golan et al.
2007/0288397 A1 * 12/2007 Frahm .................... G06Q 40/06 705/36 R
2009/0152343 A1 6/2009 Carter et al.
2010/0005034 A1 * 1/2010 Carpenter .............. G06Q 40/06 705/36 R
2010/0022254 A1 1/2010 Ashfield et al.
2011/0131130 A1 6/2011 Griffin et al.
2011/0145920 A1 * 6/2011 Mahaffey .............. H04W 12/12 726/22
2011/0166987 A1 7/2011 Hu et al.
2011/0206578 A1 * 8/2011 Foster .................. B01J 19/0046 427/539
2012/0023567 A1 1/2012 Hammad
2014/0019358 A1 1/2014 Priebatsch
2014/0289833 A1 9/2014 Briceno et al.
2015/0262184 A1 * 9/2015 Wang ................. G06Q 20/4016 705/44
2016/0055324 A1 2/2016 Agarwal
2016/0217452 A1 7/2016 Wong et al.
2017/0148027 A1 * 5/2017 Yu ...................... G06Q 10/0635

FOREIGN PATENT DOCUMENTS

CN 101685526 A 3/2010
CN 104202738 A 12/2014
CN 104202738 A * 12/2014 .............. H04W 4/24
CN 104881783 A 9/2015
CN 105323248 A 2/2016
CN 105931051 A 9/2016
EP 2156397 B1 6/2019
JP 2003-196566 A 7/2003
JP 2007-514333 A 5/2007
JP 2008-204313 A 9/2008
WO 2012042262 A1 4/2012
WO 2013191857 A1 12/2013
WO 2016/011363 A1 1/2016
WO 2016050990 A1 4/2016
WO 2018090499 A1 5/2018

OTHER PUBLICATIONS

Office Action for Japanese Application No. 2019-544885 dated Jan. 5, 2021.
Non-final rejection and Search Report for Taiwanese Application No. 106139683 dated Sep. 26, 2019 (18 pages).
Search Report for European Application No. 18754126.3 dated Oct. 29, 2019 (4 pages).
Summons to attend oral proceedings pursuant to Rule 115(1) EPC for European Application No. 18754126.3 mailed on Jul. 3, 2020.
Written opinion for Singaporean Application No. 11201907518U dated Aug. 10, 2020.
Office Action for Korean Application No. 10-2019-7025649 dated Jan. 8, 2021.
"Research on security criteria for extension of usage infrastructure of electronic authentication methods", Jan. 5, 2012, https://www.kisa.or.kr/public/library/report_View.jsp?regno=018822.
Wikipedia, "A post related to One-hot encoding", Nov. 2016, https://web.archive.org/web/20161120234046/https://en.wikipedia.org/wiki/One-hot.
Imyag12, "A post on how to deal with loss of OTP", Jan. 27, 2017, https://blog.naver.com/imyag12/220921479400.
Second Office Action for Chinese Application No. 201710089854.5 dated Feb. 3, 2020 (13 pages).
Written Opinion of the International Searching Authority and International Search Report for International Application No. PCT/CN2018/076514 dated May 4, 2018, 12 pages.
International Preliminary Report on Patentability for International Application No. PCT/CN2018/076514 dated Aug. 29, 2019, 9 pages.
First Search for Chinese Application No. 201710089854.5 dated May 21, 2019, 1 page.
First Office Action for Chinese Application No. 201710089854.5 dated Jun. 4, 2019, 11 pages.

* cited by examiner

RISK MANAGEMENT AND CONTROL METHOD AND DEVICE

CROSS-REFERENCE TO RELATED APPLICATION

This application is a continuation application of International Patent Application No. PCT/CN2018/076514, filed on Feb. 12, 2018, which is based on and claims priority of the Chinese Patent Application No. 201710089854.5, filed on Feb. 20, 2017 and entitled "RISK MANAGEMENT AND CONTROL METHOD AND DEVICE." The above-referenced applications are incorporated herein by reference in their entirety.

TECHNICAL FIELD

This application relates generally to Internet information processing technologies and computer technologies, and more specifically, to a risk management method and related devices.

BACKGROUND

Risk management is an important component of payment security. It generally includes determining a proper risk management action (i.e., control decision) for a potentially risky transaction. Possible risk management actions to a transaction may include: direct approval (no further verification needed) and requesting further identity verifications such as text message verification, face verification, etc.

Risk management action is a safety net of payment security and also a direct contact point for customer experience. The soundness of a risk management decision directly impacts the effectiveness of risk management and customer experience. An ideal control decision may include the following two aspects: on one hand, it should approve as many as possible authorized transactions; on the other hand, it should at least request further verifications for as many as possible unauthorized transactions, and these further verifications should be difficult, if possible at all, to bypass. These two aspects affect customer experiences and the effectiveness of risk management.

Conventional ways to make control decision for risk management may include two types. The first type is a rule-based method. In this type, risk management rules are determined based on a understanding to the business and transaction. These rules may take into consideration transaction elements such as transaction amount, transaction scenario, magnitude of possible loss, etc. For an actual transaction, various elements of the transaction will be analyzed, and a rule that incorporates elements most closely matching with those of the transaction will be selected. A corresponding risk decision will be made based on the selected rule. For example, for a low risk, small amount, offline transaction, such as a transaction for a ride-hailing service fee, the corresponding rule-based control decision may be requesting text message verification. The second type is a combination of the aforementioned rule-based method with additional field data from methods such as user survey. In the second type, the rules may be adjusted based on the field data. Since the user survey results may include, to some extent, personalized information of a particular type of users, customer experiences may be improved with the second type of risk management method.

The aforementioned conventional ways to make control decision, however, may have the following drawbacks. First, the rule-based method heavily relies on the rule maker's subject understanding of a business and transaction, and such understanding is inevitably prone to errors. Moreover, the rule-based method does not take into account that elements of a transaction may change over time, and thus may not be able to adapt to these changes timely. These deficiencies will lead to false positive or false negative in risk management. False negative means an unauthorized transaction is erroneously identified as an authorized transaction, and false positive means an authorized transaction is erroneously identified as an unauthorized transaction. False negative adversely affects the effectiveness of the risk management, while false positive adversely affects customer experiences in the transactions. Second, the method that takes into account the field data from user survey inevitably faces the challenges of high cost associated with the user survey and election bias due to insufficient sample sizes in the user survey. Thus, there is also room for improvement for the this type of risk management method.

SUMMARY

In view of the limitations of conventional risk management methods described above, this application provides a risk management method and related devices that address at least some of the aforementioned limitations. Various embodiments of this specification can include systems, methods, and non-transitory computer readable media for a risk management method.

Various factors, such as minimizing financial loss due to failed risk management, minimizing unnecessary interference to authorized transactions, and minimizing the cost associated with identity verification, are taken into consideration in this risk management method. Thus, this application provides a risk management method that improves transaction security without sacrificing customer experience.

This application provides a risk management method. This method may include determining a candidate verification mode set for a target event, wherein the candidate verification mode set may include one or more verification modes; determining output weights for at least some of the verification modes in the verification mode set; and selecting a verification mode for risk management of the target event from the candidate verification mode set based on the output weights.

This application further provides a risk management device, comprising one or more processors and one or more non-transitory machine-readable memories coupled to the one or more processors and configured with instructions executable by the one or more processors to cause the device to perform operations. The operations may include: determining a candidate verification mode set for a target event, wherein the candidate verification mode set may include one or more verification modes; determining output weights for at least some of the verification modes in the candidate verification mode set; and selecting a verification mode for risk management of the target event from the candidate verification mode set based on the output weights.

This application further provides a non-transitory machine-readable storage medium associated with a risk management method, configured with instructions executable by one or more processors to cause the one or more processor to perform operations. The operations may include: determining a candidate verification mode set for a target event, wherein the candidate verification mode set may include one or more verification modes; determining output weights for at least some of the verification modes in the candidate verification mode set; and selecting a verification mode for risk management of the target event from the candidate verification mode set based on the output weights.

In the risk management method of this application, multiple factors, such as risk type, device type, user preference, are taken into consideration in a quantification process of the method. Thus, this method avoids excessive reliance on subject understanding of a transaction, improves the robustness of the risk management against unauthorized transactions, and reduces unnecessary interference to authorized transactions.

The risk management method of this application utilizes existing data to the largest extent possible, and it may be easily adjusted and expanded according to different business requirements. New elements of the transactions, such as new business scenarios and new identify verification modes can also be easily incorporated into the method of this application.

These and other features of the systems, methods, and non-transitory machine-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for purposes of illustration and description only and are not intended as a definition of the limits of the invention.

Embodiments of this application will be described in details below with reference to the accompanying drawings to fully illustrate the purposes, characteristics and advantages of the aforementioned methods and devices.

BRIEF DESCRIPTION OF THE DRAWINGS

The drawings illustrate some embodiments of this application, and along with the specification, will be used to describe the embodiments of this application. The accompanying drawings only illustrate some embodiments, and thus are not an exhaustive depiction, of this application. Therefore this application is not limited by the drawings presented herein. Other drawings of the embodiments can be derived from the drawings presented herein by one of ordinary skill in the art without creative efforts.

DETAILED DESCRIPTION

Various embodiments of the present disclosure can include systems, methods, and non-transitory computer readable media for a risk management method and related devices.

To enable one of ordinary skill in the art to better understand the technical aspects of this application, the technical aspects in the embodiments of this application will be clearly and completely described below with reference to the accompanying drawings. It is obvious that the described embodiments are merely some, but not all, embodiments of the present application. Based on the embodiments of the present application, all other embodiments obtainable by one of ordinary skill in the art without creative effort shall fall within the scope of this application.

In this application, risk management may include any process of making a decision or selecting a control action regarding a potentially risky event, and there may be two or more available control decisions to choose for a potentially risky event. A potentially risky event may include various events, such as security verifications in different scenarios, account login, identity verification for online transaction and payment. There may exist multiple available control decisions for each of the aforementioned risky events. Any event involving risk management and control decision may be a proper subject event in the embodiments of this application, and the specific type of the event is not limited herein.

Figure 1:
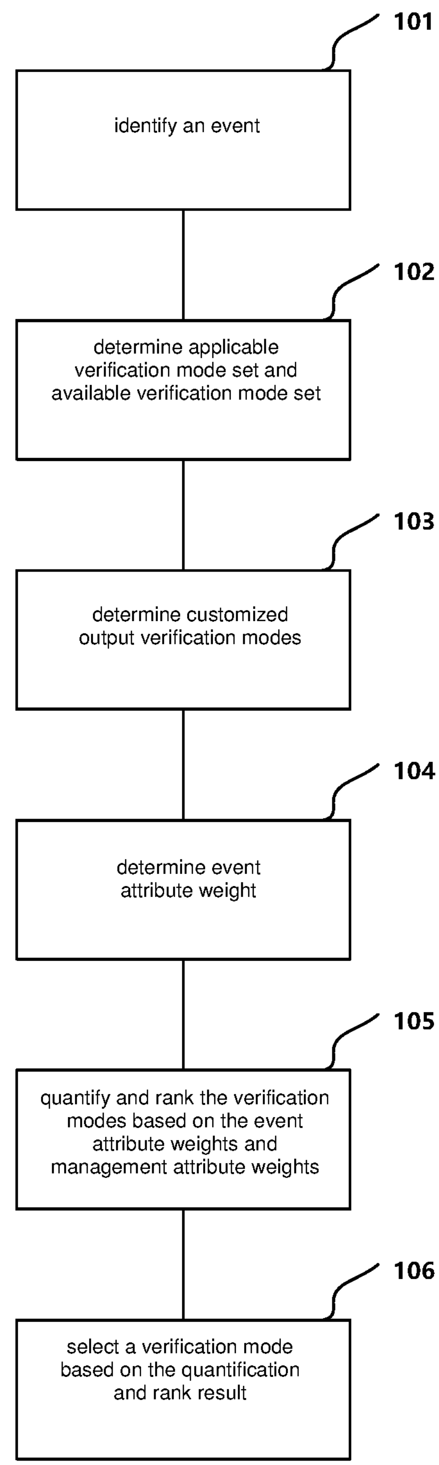
FIG. 1 shows a flowchart illustrating a risk management method according to some embodiments of this application.

FIG. 1 shows a flowchart illustrating a risk management method according to some embodiments of this application. As shown in FIG. 1, in Step 101, a user may initiate an event (i.e., a target event). Upon receiving an event, a risk management system may identify the event. Elements of the event to be identified may include, but may not be limited to, device information, risk type, etc. The elements to be identified may be determined according to parameters needed in subsequent risk management process. In some embodiments, the identified elements are factors to be considered in a quantification process. These factors will be described in details in the following examples.

In Step 102, a candidate verification mode set may be determined based on the identification result on the target event in Step 101. The candidate verification mode set may be a set of all possible verification modes or a partial set of all possible verification modes. In the case where a partial set of all possible verification modes is selected, some improper verification modes may be eliminated according to the identification result. Reasons for eliminating some improper verification modes may include factors associated with a risk type or a device.

Furthermore, the candidate verification mode set may be determined using the follows steps. First, a risk type associated with the target event may be identified, and a first verification mode set (an applicable verification mode set) may be determined based on the risk type. Second, a device type of a device that initiates and/or processes the target event may be identified, and a second verification mode set (an available verification mode set) may be determined based on the device type. Third, the candidate verification mode set may be an intersection of the first verification mode set and the second verification mode set. That is, the candidate verification mode set may include verification modes that are in both the first verification mode set and the second verification mode set.

In Step 102, the applicable verification mode set and the available verification mode set may be determined based on the identification result of the target event in Step 101. The applicable verification mode set may refer to a collection of verification modes that are determined by considering impacts of the risk type of the target event to the control decision. The available verification mode set may refer to a collection of verification modes that are determined by considering the device type of the device that initiates and/or processes the target event to the control decision (e.g., considering whether software and hardware of the device supports a verification mode). The device that initiates an event may refer to a device a party uses to bring up or start the event, and a device that processes an event may refer to a device that is necessary to complete the processing of the event. Both the device that initiates an event and the device that processes an event need to be considered because the to-be-verified subject may change in actual situations.

In Step 102, the candidate verification mode set for a target event may be determined based on both the applicable verification mode set and the available verification mode set. The candidate verification mode set, however, may also be determined by other methods. For example, the candidate verification mode set may be the same as the available verification mode set. In that case the process to produce an applicable verification mode set may be omitted.

In Step 103, the two verification mode sets determined in Step 102 (i.e., the applicable verification mode set and the available verification mode set) may go through an intersection process to obtain the candidate verification mode set. Thus the verification modes in the candidate verification mode set may be the verification modes that are in both the applicable verification mode set and the available verification mode set.

In Step 104, an event attribute weight may be determined for each of the elements of the target event that are identified in Step 101. These elements will be quantified in the following processes. Different elements may be selected for different application scenarios. Generally, these elements may include, but may not be limited to, a user type associated with the target event, a scenario type associated with the target event, and a user preference associated with the target event. Corresponding to these elements, a user type weight may be determined based on the user type, a scenario type weight may be determined based on the scenario type, and a user preference weight may be determined based on the user preference. Generally, one element is selected in this process means this element will be a factor that influences the control decision to the target event. The event attribute weight of each element represents the factor's importance in the control decision, and is typically determined after all elements are considered. Once an event attribute weight for an element is determined, it remains consistent for all the verification modes. The event attribute weight reflects, in general, the importance of a corresponding element of the target event. In other words, an element having a higher event attribute weight indicates a higher impact of this element on the final control decision.

In Step 105, the candidate verification mode set determined in Step 103 is quantified and sorted. First, a management attribute weight vector associated with each verification mode in the candidate verification mode set may be determined. The management attribute weight vector may include management attribute weights for the to-be-quantified elements. For example, if there are N to-be-quantified elements for a target event, there will be N corresponding management attribute weights each associated with one element. Thus the management attribute weight vector may be an N-dimensional vector comprising N components. After the management attribute weight vector for that verification mode is determined, it will be multiplied with an event attribute weight vector that comprises event attribute weights for the to-be-quantified elements of the target event. The multiplication result is an output weight for the verification mode in the candidate verification mode set. While the event attribute weights reflect attributes of a target event, the management attribute weights reflect more of a comparison among various verification modes, that is, the attributes of the verification modes. The higher the management attribute weight, the more important the corresponding to-be-quantified element in the verification mode.

The management attribute weight vector may be a vector estimated in advanced based on historical big data. For example, the management attribute weight vector may be determined using the genetic algorithm or other optimization algorithms. After historical big data or some samples of the historical big data are obtained, numbers of actual occurrences of some criteria may be counted. Then the management attribute weights may be determined by optimizing an optimization criterion (i.e., a preset criterion such as a pass rate) under certain criterion thresholds or constraint conditions (such as minimum/maximum ratio of certain verification modes). For example, the optimization process to obtain a management attribute weight vector may be expressed as:

$$\text{Min Index1, Given Index2} < 0.02\% \quad \text{(Formula 1)}$$

Wherein Index1 is a target criterion and Index2 is a constraint criterion. In other words, the meaning of Formula 1 is that, provided that the given constraint criterion (Index2) is less than 0.02%, the management attribute weight may be obtained by finding a management attribute weight that results in the smallest target criterion (Index1) under the constraint condition that the given constraint criterion (Index2) is less than 0.02%. Then a management attribute weight vector for this verification mode may be obtained when all the management attribute weights are determined by the aforementioned optimization method.

By using a similar algorithm to estimate historical big data, a management attribute weight vector for each verification mode may be obtained. For example, the management attribute weight vector for the $i^{th}$ verification mode ($W_i$) may be expressed as:

$$W_i=(w_{i1}, w_{i2}, w_{i3} \ldots) \quad \text{(Formula 2)}$$

Where $w_{i1}$, $w_{i2}$, $w_{i3}$ . . . are management attribute weights for the $1^{st}$, $2^{nd}$, $3^{rd}$, . . . event attribute weights, respectively. Thus, for each verification mode, an output weight of the verification mode can be calculated using the corresponding quantification vectors (e.g., the management attribute weight vector). For the $i^{th}$ verification mode, the output weight (or output score) may be computed by:

$$\text{Score}(i)=w_{i1}*K_1+w_{i2}*K_2+w_{i3}*K_3+3w \quad \text{(Formula 3)}$$

where $K_1$, $K_2$, and $K_3$ in Formula 3 represent an event attribute weight of each to-be-quantified element, respectively.

Assuming that there are a total of three candidate verification modes available for an event, the weights of each verification mode may be calculated using the aforementioned method to obtain output weights (Score(1), Score(2), and Score(3)) for these verification modes. By comparing the ranking of the output weights (Score(1), Score(2), and Score(3)), the verification mode having the highest output weight may be selected as the verification mode for the event.

In the process of quantification and ranking, since the quantification parameters (e.g., management attribute weights) have taken into consideration historical big data, this method may minimize the reliance on the subject understanding of transactions by a rule developer. At the same time, in determining the quantification parameters, constraint conditions related to a transaction may be selected as the parameters, thus the quantification parameters may be adjusted according to different transaction requirements.

In Step 106, the final control decision (i.e., verification mode selected for the event) is determined based on the quantification and ranking result in Step 105.

This method may further include a process to test the management attribute weight. To test the management attribute weight, historical sample data (i.e., test events) may first be obtained. The historical sample data may comprise events that have been identified (to be either authorized or unauthorized) and prior verification modes used to verify these events in prior risk management processes. Then, the historical sample data may go through a quantification process using the to-be-tested management attribute weight vector to obtain the test verification mode. The quantification process may be the same as that set forth in Steps 101 to 106. Then the effectiveness of the management attribute weight vector may be evaluated by comparing the results (control decision) using the to-be-evaluated management attribute weight vector with the recorded results (control decision). Furthermore, the management attribute weight vector may be further adjusted based on the comparison result. That is, some or all weights in the management attribute weight vector may be adjusted. In other words, the relative importance of each event attribute weight may be further adjusted based on the comparison result.

The aforementioned test may comprise designating some of the historical events as test events. That is, some historical events may be selected as test events. The test may further comprise determining a first number of the test events that satisfied a designated condition based on verification modes determined for the test events, determining test verification modes for the test events based on the management attribute weights, and determining a second number of the test events that satisfied the designated condition based on the test verification modes. The first number is the number of test events in which control decisions satisfying the designated condition were made in prior risk management processes, and the second number is the number of test events in which control decisions satisfying the designated condition will be made if the risk management method of this application is used. The management attribute weights may be adjusted based on a comparison result of the first number and the second number. In the test, by designating a particular type of history events as test events and selecting proper designated conditions, the effectiveness of the risk management method to this particular type of events can be evaluated through the second number.

Based on numerous samples and evaluation processes, four types of test events and corresponding designated conditions are proposed as evaluation criteria for the risk management method. These four event-condition pairs are listed below.

First, if a test event is an authorized historical event that has passed a prior verification mode, the corresponding designated condition is that the verification mode determined for the test event is direct approval. In this application, an authorized event may refer to an event (or a transaction) that is initiated or processed by an authentic user. Ideally, all authorized events should be approved. This criterion indicates whether this risk management method can approve as many as possible authorized transactions.

Second, if a test event is an authorized historical event that has failed to pass a prior verification mode, the designated condition is that the verification mode determined for the test event is direct approval or is different from the prior verification mode. This criterion indicates that, for an authorized transaction that has failed to pass a verification before, whether this risk management method can provide as many as possible direct approval or provide a verification mode different from the prior verification mode.

Third, if a test event is an unauthorized historical event that has been directly approved, the designated condition is that the verification mode determined for the test event is not direct approval. In this application, an unauthorized event may refer to an event (or a transaction) initiated by a malicious third-party without permission. Ideally, all unauthorized events should be denied. This criterion shows that, for an unauthorized event that has been erroneously approved in a prior risk management, whether this risk management method can correctly identify them and request further verifications.

Fourth, if a test event is an unauthorized historical event that has passed a prior verification mode, the designated condition is that the verification mode determined for the test event is different from the prior verification mode. This criterion shows that, for an unauthorized event that has passed a prior verification mode, whether this risk management method can provide a different verification mode.

The first evaluation criterion shows, for an authorized event, whether the to-be-evaluated weight vector can reduce the number of verification requests (i.e., as many as possible events should be directly approved). Since an authorized event is a transaction event without risk, an ideal result is that all authorized events should be directly approved, which nevertheless is difficult to achieve in reality. Therefore, outputting as many direct approval as possible indicates that the to-be-evaluated weight vector is able to provide better user experience for authorized transactions.

The second evaluation criterion is similar to the first evaluation criterion in that they both focus on authorized events. Directly approving as many as possible authorized event is a goal to achieve for improving user experience. Requesting further verification for an authorized event or, even worse, erroneously denying the event due to failed verification may adversely affect customer experience. Thus, if the to-be-evaluated weight vector can produce a verification mode different from the verification mode previously used, the likelihood of successful verification may be improved, and better customer experience may be achieved.

The third evaluation criterion evaluates the security of the to-be-evaluated weight vector. Ideally, all unauthorized events should be denied or at least be requested further verification for. Therefore, if the to-be-evaluated weight vector can result in further verification, such as text message verification or face verification, for the events that have previously been directly approved, it shows that the to-be-evaluated weight vector improves the security of the risk management method.

Similar to the third evaluation criterion, the fourth evaluation criterion also evaluates the security of the to-be-evaluated weight vector. Verification request for an unauthorized event may be bypassed in a scenario that involves a lost mobile phone, or a scenario where the risk management information is compromised by a hacker or virus. A verification mode that has been bypassed is unable to properly identify the risk associated with the event. Therefore, if, through the to-be-evaluated weight vector, a different verification mode can be provided, the likelihood that the unauthorized event is detected and denied may be improved. For example, when a mobile phone is lost, a verification mode of text message verification will not be able to identify the risk and prevent possible financial loss. However, if, through the to-be-evaluated weight vector, a different verification mode, such as face verification, or deny the transaction, can be provided, the risk may be recognized and avoided, and the financial loss may be prevented.

In addition, in some embodiments, as an application scenario applicable to the technical solutions of this application, the event may be a transaction payment event, in particular a transaction event that uses a device for payment. The transaction event may be, for example, a process that a merchant initiates a payment and a user completes the payment.

Figure 2:
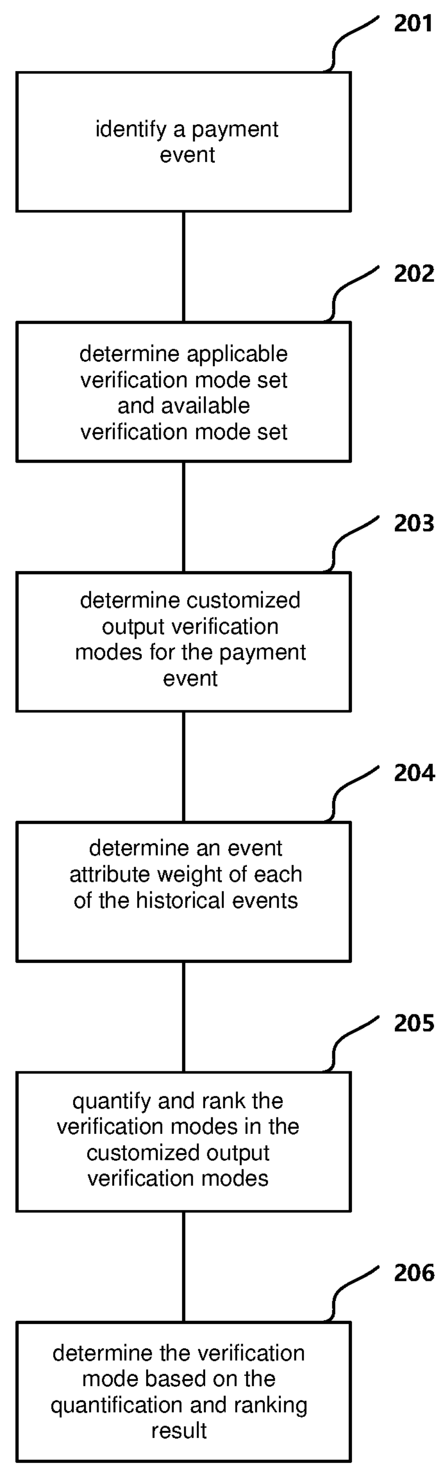
FIG. 2 shows a flowchart illustrating a payment risk management method according to some embodiments of this application.

FIG. 2 shows a flowchart illustrating a payment risk management method according to some embodiments of this application. As shown in FIG. 2, in Step 201, a user may initiate a target event (i.e., a payment event). Upon receiving an event, a risk management system may identify the target event. Elements to be identified may include, but may not be limited to, device information, risk type, etc. The elements to be identified may be determined according to parameters needed in subsequent risk management process. In some embodiments, the identified elements are factors to be considered in a quantification process. These factors will be described in details in the following examples.

Then a candidate verification mode set may be determined based on the identification result on Step 201. For example, the candidate verification mode set may be determined using the following steps. First, a risk type associated with the target event may be identified, and a first verification mode set (i.e., an applicable verification mode set) may be determined based on the risk type (e.g., transaction amount, online/offline, magnitude of possible loss, etc.). Second, a device type of a device (e.g., a mobile phone) that initiates and/or processes the target event may be identified, and a second verification mode set (i.e., an available verification mode set) may be determined based on the device type. Third, the candidate verification mode set may be set as an intersection of the first verification mode set and the second verification mode set.

More specifically, in Step 202, the applicable management method set and the available management method set may be determined based on the identification result in Step 201. The candidate verification mode set may be a set of all possible verification modes or a partial set of all possible verification modes. In the case where a partial set of all possible verification modes is selected, some improper verification modes may be eliminated based on the identification result (e.g., if the mobile phone used by the user who completes the payment does not have hardware or software for fingerprint verification, then the fingerprint verification mode is improper and will be eliminated). Reasons for eliminating some improper verification modes may include a risk type factor and a device factor.

The applicable verification mode set may refer to a collection of verification modes that are determined by considering impacts of the risk type of the target event to the control decision. For example, if there exists a risk that a transaction may be associated with a lost mobile phone, then the applicable verification mode set should not include a text message verification mode. The available verification mode set may refer to a collection of verification modes that are determined by considering whether the corresponding verification modes are supported by hardware or software of the device of the to-be-verified party in the target event. For example, if a mobile phone in the target event does not have a component that supports fingerprint verification, the available verification mode set should not include fingerprint verification mode. In determining the applicable verification mode set and the available verification mode set, because the impact of the risk type on verification mode set is considered, the transaction security may be improved to some extent. Financial losses caused by transactions using, for example, a lost or stolen mobile phone may be reduced or avoided. On the other hand, by checking whether corresponding hardware and software of a device support a verification mode, unsupported verification modes may be eliminated, which may improve user experience.

In Step 203, the two verification mode sets determined in Step 202 (i.e., the applicable verification mode set and the available verification mode set) may go through an intersection process to get a candidate verification mode set that includes verification modes in both the applicable verification mode set and the available verification mode set. In one example, all possible verification modes may include: 0. Direct approval, 1. Text message verification, 2. Knowledge-Based Authentication (KBA), 3. Face verification, 4. Fingerprint verification, 5. Deny the transaction, and 6. Deny the transaction and freeze account balance. In Step 202, the applicable verification mode set determined according to the risk type may include: 0. Direct approval, 1. Text message verification, 3. Face verification, and 5. Deny the transaction. The available verification mode set determined according to factors such as device and software in the target event may include: 0. Direct pass, 1. Text message verification, 2. Knowledge-Based Authentication (KBA), and 5. Deny the transaction. In Step 203, the above-described two verification mode sets may go through an intersection process to determine a final verification mode set, which may include: 0. Direct approval, 1. Text message verification, and 5. Deny the transaction. The final verification mode set may be used as a candidate verification mode set for control decision, and it reflects comprehensive considerations of both transaction security and user experiences.

In Step 204, weights for the to-be-quantified elements (i.e., event attribute weights) may be determined based on the identified event. The elements are factors that need to be considered for making a control decision, while the event attribute weight of each element represents the element's importance in the entire risk management method. The event attribute weight is typically determined after all elements are considered. The event attribute weight, once determined, remains the same for all verification modes. These elements may include, but may not be limited to, user type associated with an event, scenario type associated with an event, and user preference of an event. Correspondingly, a user type weight may be determined based on the user type, a scenario type weight may be determined based on the scenario type, and a user preference weight may be determined based on the user preference. Generally, the to-be-considered elements are the factors that will be considered when considering verification modes. For example, a user type associated with an event may include, according to experience or historical data, students, young people, mid-aged people, senior people, people with disabilities, etc., and a user type weight (or user type score) may be assigned to each user type. Similarly, a scenario type associated with an event may include: offline payment, online payment, and a scenario type weight (or scenario type score) may be assigned to each scenario type. Similarly, a user preference of an event may include preference for text message verification, preference for fingerprint verification, preference for face verification, etc., and a user preference weight (or user preference score) may be assigned to each user preference type. The aforementioned classifications of user type, scenario type and user preference may not be the only classifications. In fact, the classifications may be determined by comprehensively considering various aspects of an event such as experience, historical data, calculation cost, etc. For example, for scenario type, offline payment may be further divided into various transaction types, such as ride-hailing, shopping, food and beverage service, and online payment may also be further divided into online shopping, credit card payment, etc. For each classification of each to-be-quantified element, the weight may be preset as:

TABLE 1

| User Type | Student | Young People | Mid-Age People | Senior People | People with disabilities |
|---|---|---|---|---|---|
| User Type Weight | X1 | X2 | X3 | X4 | X5 |

TABLE 2

| Scenario Type | Offline Payment | Online Payment |
|---|---|---|
| Scenario Type Weight | Y1 | Y2 |

TABLE 3

| User Preference | Text Message Verification | Fingerprint Verification | Face Verification |
|---|---|---|---|
| User Preference Type | Z1 | Z2 | Z3 |

In Step 205, the verification modes in the candidate verification mode set determined in Step 203 are quantified and ranked. In Step 205, a management attribute weight vector is first obtained for each candidate verification mode. The management attribute weight vector is formed by management attribute weights of all to-be-quantified elements. If there is N to-be-quantified elements, there would be N corresponding management attribute weights. After the management attribute weight vector of the candidate verification mode is determined, the management attribute weight vector may be multiplied by a vector formed by event attribute weights of the to-be-quantified elements (an event attribute weight vector).

The management attribute weight vector may be a vector estimated in advanced according to historical big data. For example, the management attribute weight vector may be obtained using the genetic algorithm or other optimization algorithms. After historical big data or some samples in the historical big data are obtained, a number of actual occurrences of some criteria (e.g., an amount of financial loss) may be determined. Then the management attribute weights may be obtained by optimizing an optimization criterion (i.e., a preset criterion such as a pass rate) under certain criterion thresholds or some constraint conditions (such as minimum/maximum ratio of certain verification modes). For example, the optimization process to obtain the management attribute weight may be expressed as:

$$\text{Min Cost1,Given Index2}<0.03\% \quad \text{(Formula 4)}$$

Wherein Cost1 is a target criterion and Index2 is a constraint criterion. For example, Cost1 may be a total amount of financial loss of a transaction set, and Index2 may be a percent of a text message verification mode in all verification modes. In other words, the meaning of Formula 4 is that, provided that the percent of a text message verification mode in all verification modes is less than 0.03%, the management attribute weight may be obtained by finding a management attribute weight that results in the smallest total amount of financial loss of the transaction (Cost1) under the constraint condition that the given constraint criterion (Index2) is less than 0.03%. Then the management attribute weight vector for this verification mode (text message verification) may be obtained when all the management attribute weights are determined by the aforementioned optimization method.

By using a similar algorithm to estimate historical big data, a management attribute weight vector for each verification mode may be obtained. For example, the management attribute weight vector for a quantification process having three event attribute weights may be expressed as:

$$W_i=(w_{i1},w_{i2},w_{i3}) \quad \text{(Formula 5)}$$

Where $w_{i1}$, $w_{i2}$, $w_{i3}$ are management attribute weights for the $1^{st}$, $2^{nd}$, and $3^{rd}$ event attribute weights, respectively. Therefore, for each verification mode, an output weight of the verification mode may be calculated using the corresponding quantification vector (e.g., the management attribute weight vector). For example, for the $i^{th}$ verification mode, the output weight (or output score) may be computed by:

$$\text{Score}(i)=w_{i1}*K_1+w_{i2}*K_2+w_{i3}*K_3 \quad \text{(Formula 6)}$$

Where $K_1$, $K_2$, and $K_3$ in Formula 6 represent an event attribute weight of each to-be-quantified element, respectively. The values of the event attribute weights are shown in Tables 1 to 3.

For example, for a target event of "a senior people makes an offline payment for ride-hailing fee," the verification mode set determined in Step 203 may include: 0. Direct approval, 1. Text message verification, and 5. Deny the transaction. Based on the weight of the to-be-quantified elements, management attribute weight vectors $W_0$, $W_1$, and $W_5$ may be obtained. The management attribute weight vectors are $W_0=(w_{01}, w_{02}, w_{03})$, $W_1=(w_{11}, w_{12}, w_{13})$, and $W_5=(w_{51}, w_{52}, w_{53})$. The vector formed by event attribute weights of the to-be-quantified elements is $(X_4, Y_1, Z_1)$. Then, the output weights (or output scores) may be calculated according to Formula 6 for each verification mode. For example, for text message verification mode, the output weight may be calculated by:

$$\text{Score}(1)=w_{11}*X_4+W_{12}*Y_1+w_{13}*Z_1 \quad \text{(Formula 7)}$$

Weights of the other two candidate verification modes (Score(0) and Score(5)) may be calculated using similar methods. Then, Score(0), Score(1), and Score(5) are compared and ranked, and the one having the highest weight may be selected as the verification mode.

In the process of quantitative ranking, since the quantification parameters (e.g., management attribute weights) have fully considered historical big data, particularly personalized demands in the historical big data, this application can minimize the reliance on the understanding of transactions by a rule developer. At the same time, in the process of determining the quantification parameters of this application, main transaction constraints may be used as parameters, and then the quantification parameters may be adjusted according to different transaction demands.

In Step 206, the final control decision (i.e., the verification mode used for the event) is fed back to the risk management system based on the quantification and ranking result in Step 205.

This method may further include evaluating the management attribute weight before determining the management attribute weight. The evaluation process is similar to that in the first embodiment of this application with the difference being that the historical events are transaction payment events, the verification modes are verification modes applicable to transaction payment events, and the associated designated condition is a desired condition in transaction payment.

Figure 3:
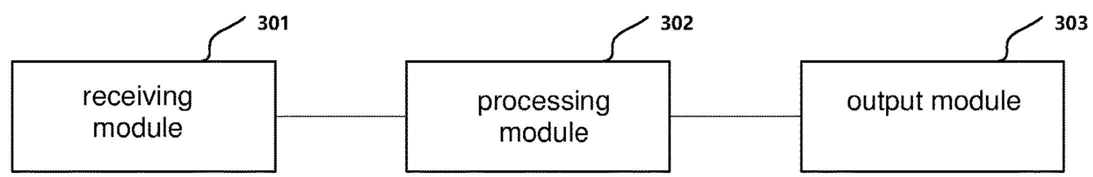
FIG. 3 shows a schematic structural diagram illustrating a risk management device according to some embodiments of this application.

FIG. 3 shows a schematic structural diagram illustrating a risk management device according to some embodiments of this application. As shown in FIG. 3, the device may comprise: a receiving module 301 for receiving a target event for risk management and a processing module 302 for determining a candidate verification mode set, determining at least one event attribute weight based on the target event, determining at least one management attribute weight based on the target event, and determining output weights for at least some of the verification modes in the candidate verification mode set based on the at least one event attribute weight and the at least one management attribute weight. The device may further include an output module 303 configured to output a verification mode for risk management of the target event from the candidate verification mode set based on the output weights for the at least some of the verification modes.

In some embodiments, the processing module 302 may be further configured to identify a risk type associated with the target event, and determine a first verification mode set based on the risk type; identify a device type of a device that initiates and/or processes the target event, and determine a second verification mode set based on the device type; and set the candidate verification mode set as an intersection of the first verification mode set and the second verification mode set.

In some embodiments, the processing module 302 may be further configured to identify a user type weight associated with a user type for the target event, identify a scenario type weight associated with the scenario type of the target event, and identify a user preference weight associated with a user preference of the target event.

In some embodiments, the processing module 302 may be further configured to determine at least one management attribute weight based on verification modes determined for historical events.

More specifically, the aforementioned process to determine at least one management attribute weight may comprise: determining event attribute weights for the historical events; determining an optimization criterion and a constraint condition; and determining a management attribute weight by optimizing the optimization criterion based on the constraint condition and the event attribute weights.

The processing module 302 may be further configured to use an equation of $S_i=\Sigma_{j=1}^{n}w_{ij}\cdot K_j$ to determine an output weight $S_i$ associated with the $i^{th}$ verification mode in the candidate verification set, where $w_{ij}$ is the $j^{th}$ management attribute weight, $K_j$ is the $j^{th}$ event attribute weight, and n is a total number of event attribute weights.

In some embodiments, the processing module 302 may be further configured to:

designate some historical events as test events; based on verification modes determined for the test events, determine a first number of the test events that satisfies a designated condition; determine test verification modes for the test events based on the management attribute weights; based on the test verification modes, determine a second number of test events that satisfies the designated condition; and adjust the management attribute weight based on a comparison result of the first number and the second number.

Figure 4:
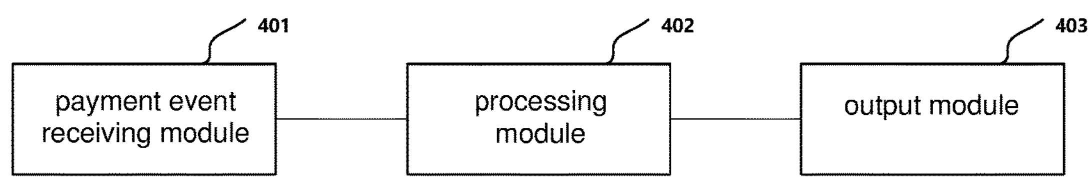
FIG. 4 shows a schematic structural diagram illustrating a payment risk management device according to some embodiments of this application.

FIG. 4 shows a schematic structural diagram illustrating a payment risk management device according to some embodiments of this application. The risk management device for transaction payment events, as shown in FIG. 4, is different from the embodiment shown in FIG. 3 in that the historical events are transaction payment events, the verification modes are verification modes applicable to transaction payment events, and the associated designated condition is a desired condition in transaction payment.

The present application further provides a transaction risk management method, which uses the risk management method according to the embodiments of this application.

The present application further provides a transaction risk management device, which comprises the risk management device according to the embodiments of this application.

One of ordinary skill in the art can understand details about the operation and processes of the system and apparatus described above by referring to corresponding processes in the method embodiments described above. In some embodiments, the division of the modules may be logical or functional. Alternative methods of division may be used. Multiple modules or components may be combined or integrated into another system. Some features may be omitted or not executed. The mutual coupling, direct coupling, or communication connection that is illustrated or discussed may be replaced by indirect coupling or communication connection through suitable communication interfaces, apparatuses, or modules, which may be electrical, mechanical, or in other suitable forms.

Each of the processes, methods, and algorithms described in the preceding sections may be embodied in, and fully or partially automated by, software or code modules executed by one or more computer systems or computer processors comprising computer hardware. The processes and algorithms may be implemented partially or wholly in application-specific circuitry.

The software or code modules may be implemented as separated sections or blocks of program code. One or more of the software or code modules may alternatively be integrated into one section or block of program code. When the functions disclosed herein are implemented in the form of software functional modules and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments disclosed herein. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A risk management method, comprising:

receiving, by a device from a terminal device, a target event;

determining, by the device, a plurality of event attribute weights according to the target event, wherein the event attribute weights include a user type weight, a scenario type weight, and a user preference weight, wherein the user type weight is based on a user type associated with the target event, wherein the scenario type weight is based on a scenario type associated with the target event, and wherein the user preference weight is based on a user preference associated with the target event;

identifying, by the device, a risk type associated with the target event, wherein the risk type includes whether the target event is online or offline;

determining, by the device, a first verification mode set based on the risk type;

identifying, by the device, a device type of the terminal device;

determining, by the device, a second verification mode set based at least on excluding fingerprint verification from the second verification mode set in response to the terminal device does not have a hardware or software component that supports the fingerprint verification;

setting, by the device, an intersection of the first verification mode set and the second verification mode set as a candidate verification mode set for the target event, wherein the candidate verification mode set comprises a plurality of verification modes;

determining, by the device executing a genetic algorithm based on a plurality of historical events, management attribute weight vectors each comprising a plurality of management attribute weights and respectively corresponding to at least some of the verification modes;

determining, by the device based on the event attribute weights and the management attribute weight vectors, output weights respectively for the at least some of the verification modes in the candidate verification mode set;

selecting, by the device, a verification mode for risk management of the target event from the candidate verification mode set based on the output weights, the selected verification mode associated with a largest output weight among the output weights; and outputting, by the device to the terminal device, the selected verification mode for risk management of the target event.

2. The risk management method of claim 1, wherein the determining a plurality of event attribute weights according to the target event comprises at least one of the following:

(1). identifying the user type associated with the target event, and determining the user type weight based on the user type;

(2). identifying the scenario type associated with the target event, and determining the scenario type weight based on the scenario type; and (3). identifying the user preference associated with the target event, and determining the user preference weight based on the user preference.

3. The risk management method of claim 1, further comprising:

determining the plurality of management attribute weights based on verification modes determined for the historical events.

4. The risk management method of claim 3, wherein the determining the plurality of management attribute weights based on verification modes determined for the historical events comprises:

determining multiple event attribute weights for the historical events;

determining an optimization criterion and a constraint condition; and determining the plurality of management attribute weights by optimizing the optimization criterion based on the constraint condition and the multiple event attribute weights.

5. The risk management method of claim 4, further comprising:

designating some historical events as test events;

based on verification modes determined for the test events, determining a first number of the test events that satisfies a designated condition;

determining test verification modes for the test events based on the plurality of management attribute weights;

based on the test verification modes, determining a second number of the test events that satisfies the designated condition; and adjusting the plurality of management attribute weights based on a comparison result of the first number and the second number.

6. The risk management method of claim 5, wherein:

(1). if a test event is an authorized historical event that has passed a prior verification mode, the designated condition is that the verification mode determined for the test event is direct approval;

(2). if a test event is an authorized historical event that has failed to pass a prior verification mode, the designated condition is that the verification mode determined for the test event is direct approval or is different from the prior verification mode;

(3). if a test event is an unauthorized historical event that has been directly approved, the designated condition is that the verification mode determined for the test event is not direct approval; and (4). if a test event is an unauthorized historical event that has passed a prior verification mode, the designated condition is that the verification mode determined for the test event is different from the prior verification mode.

7. The risk management method of claim 1, wherein the determining output weights respectively for the at least some of the verification modes in the candidate verification mode set comprises:

determining an output weight $S_i$ associated with the $i^{th}$ verification mode in the candidate verification mode set using an equation of $S_i=\Sigma_{j=1}^{n} w_{ij} \cdot K_j$, where $w_{ij}$ is the $j^{th}$ management attribute weight, $K_j$ is the $j^{th}$ event attribute weight, and n is a total number of event attribute weights.

8. A risk management device, comprising one or more processors and one or more non-transitory machine-readable memories coupled to the one or more processors and configured with instructions executable by the one or more processors to cause the device to perform operations comprising:

receiving, from a terminal device, a target event;

determining a plurality of event attribute weights according to the target event, wherein the event attribute weights include a user type weight, a scenario type weight, and a user preference weight, wherein the user type weight is based on a user type associated with the target event, wherein the scenario type weight is based on a scenario type associated with the target event, and wherein the user preference weight is based on a user preference associated with the target event;

identifying a risk type associated with the target event, wherein the risk type includes whether the target event is online or offline;

determining a first verification mode set based on the risk type;

identifying a device type of the terminal device;

determining a second verification mode set based at least on excluding fingerprint verification from the second verification mode set in response to the terminal device does not have a hardware or software component that supports the fingerprint verification;

setting an intersection of the first verification mode set and the second verification mode set as a candidate verification mode set for the target event, wherein the candidate verification mode set comprises a plurality of verification modes;

determining, by executing a genetic algorithm based on a plurality of historical events, management attribute weight vectors each comprising a plurality of management attribute weights and respectively corresponding to at least some of the verification modes;

determining, based on the event attribute weights and the management attribute weight vectors, output weights respectively for the at least some of the verification modes in the candidate verification mode set;

selecting a verification mode for risk management of the target event from the candidate verification mode set based on the output weights, the selected verification mode associated with a largest output weight among the output weights; and outputting, to the terminal device, the selected verification mode for risk management of the target event.

9. The risk management device of claim 8, wherein the determining a plurality of event attribute weights according to the target event comprises at least one of the following:

(1). identifying the user type associated with the target event, and determining the user type weight based on the user type;

(2). identifying the scenario type associated with the target event, and determining the scenario type weight based on the scenario type; and (3). identifying the user preference associated with the target event, and determining the user preference weight based on the user preference.

10. The risk management device of claim 8, further comprising:

determining the plurality of management attribute weights based on verification modes determined for the historical events.

11. The risk management device of claim 10, wherein the determining the plurality of management attribute weights based on verification modes determined for the historical events comprises:

determining multiple event attribute weights for the historical events;

determining an optimization criterion and a constraint condition; and determining the plurality of management attribute weights by optimizing the optimization criterion based on the constraint condition and the multiple event attribute weights.

12. The risk management device of claim 11, wherein the operations further comprise:

designating some historical events as test events;

based on verification modes determined for the test events, determining a first number of the test events that satisfies a designated condition;

determining test verification modes for the test events based on the plurality of management attribute weights;

based on the test verification modes, determining a second number of the test events that satisfies the designated condition; and adjusting the plurality of management attribute weights based on a comparison result of the first number and the second number.

13. The risk management device of claim 12, wherein in the operations:

(1). if a test event is an authorized historical event that has passed a prior verification mode, the designated condition is that the verification mode determined for the test event is direct approval;

(2). if a test event is an authorized historical event that has failed to pass a prior verification mode, the designated condition is that the verification mode determined for the test event is direct approval or is different from the prior verification mode;

(3). if a test event is an unauthorized historical event that has been directly approved, the designated condition is that the verification mode determined for the test event is not direct approval; and (4). if a test event is an unauthorized historical event that has passed a prior verification mode, the designated condition is that the verification mode determined for the test event is different from the prior verification mode.

14. The risk management device of claim 8, wherein the determining output weights respectively for the at least some of the verification modes in the candidate verification mode set comprises:

determining an output weight $S_i$ associated with the $i^{th}$ verification mode in the candidate verification mode set using an equation of $S_i=\Sigma_{j=1}^{n} w_{ij} \cdot K_j$, where $w_{ij}$ is the $j^{th}$ management attribute weight, $K_j$ is the $j^{th}$ event attribute weight, and n is a total number of event attribute weights.

15. A non-transitory machine-readable storage medium associated with a risk management method, configured with instructions executable by one or more processors to cause the one or more processor to perform operations comprising:

receiving, from a terminal device, a target event;

determining a plurality of event attribute weights according to the target event, wherein the event attribute weights include a user type weight, a scenario type weight, and a user preference weight, wherein the user type weight is based on a user type associated with the target event, wherein the scenario type weight is based on a scenario type associated with the target event, and wherein the user preference weight is based on a user preference associated with the target event;

identifying a risk type associated with the target event, wherein the risk type includes whether the target event is online or offline;

determining a first verification mode set based on the risk type;

identifying a device type of the terminal device;

determining a second verification mode set based at least on excluding fingerprint verification from the second verification mode set in response to the terminal device does not have a hardware or software component that supports the fingerprint verification;

setting an intersection of the first verification mode set and the second verification mode set as a candidate verification mode set for the target event, wherein the candidate verification mode set comprises a plurality of verification modes;

determining, by executing a genetic algorithm based on a plurality of historical events, management attribute weight vectors each comprising a plurality of management attribute weights and respectively corresponding to at least some of the verification modes;

determining, based on the event attribute weights and the management attribute weight vectors, output weights respectively for the at least some of the verification modes in the candidate verification mode set;

selecting a verification mode for risk management of the target event from the candidate verification mode set based on the output weights, the selected verification mode associated with a largest output weight among the output weights; and outputting, to the terminal device, the selected verification mode for risk management of the target event.

* * * * *